US011765791B2

(12) United States Patent
Panchal

(10) Patent No.: US 11,765,791 B2
(45) Date of Patent: Sep. 19, 2023

(54) SYSTEMS AND METHODS FOR PROVIDING LOW LATENCY SERVICES VIA AN EVOLVED PACKET CORE NETWORK

(71) Applicant: Verizon Patent and Licensing Inc., Basking Ridge, NJ (US)

(72) Inventor: Jignesh S. Panchal, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 10 days.

(21) Appl. No.: 17/505,584

(22) Filed: Oct. 19, 2021

(65) Prior Publication Data

US 2022/0046758 A1    Feb. 10, 2022

Related U.S. Application Data

(63) Continuation of application No. 16/669,272, filed on Oct. 30, 2019, now Pat. No. 11,184,953.

(51) Int. Cl.
| | | |
|---|---|---|
| H04W 88/18 | (2009.01) | |
| H04W 28/12 | (2009.01) | |
| H04W 28/02 | (2009.01) | |
| H04W 8/08 | (2009.01) | |
| H04W 8/04 | (2009.01) | |
| H04W 76/27 | (2018.01) | |

(Continued)

(52) U.S. Cl.
CPC .......... *H04W 88/18* (2013.01); *H04M 15/66* (2013.01); *H04W 8/04* (2013.01); *H04W 8/08* (2013.01); *H04W 28/0268* (2013.01); *H04W 28/12* (2013.01); *H04W 76/27* (2018.02); *H04L 2101/375* (2022.05)

(58) Field of Classification Search
CPC ......... H04W 88/18; H04W 8/04; H04W 8/08; H04W 28/0268; H04W 28/12; H04W 76/27; H04M 15/66; H04L 2101/375
See application file for complete search history.

(56) References Cited

U.S. PATENT DOCUMENTS

| | | | |
|---|---|---|---|
| 10,448,268 B1 | 10/2019 | Jaya et al. | |
| 10,798,617 B1 * | 10/2020 | Ghadge | ................... H04W 8/08 |

(Continued)

FOREIGN PATENT DOCUMENTS

WO    2019/086719    5/2019

*Primary Examiner* — Chae S Lee

(57) ABSTRACT

A controller may create pseudo-slices to provide differentiated levels of service and/or execution of services at different edge locations within an Evolved Packet Core ("EPC") network based on existing identifiers that are used to configure control plane and/or user plane function of the network. Each pseudo-slice may allow User Equipment ("UE") to directly exchange user plane traffic with remote nodes in the core network for latency insensitive services, or with local nodes at the closer edge locations for low latency services. The different classes of service provided by the controller may be based on an Access Point Name ("APN"), Quality-of-Service Class Identifier ("QCI"), Service Provider Identifier ("SPID"), Allocation and Retention Priority ("ARP"), and/or other request or profile identifiers. The controller may also create pseudo-slices to leverage Fifth Generation ("5G") connectivity when exchanging the user plane traffic in an EPC network that supports 5G Non-Standalone Access ("NSA").

20 Claims, 8 Drawing Sheets

(51) Int. Cl.
  *H04M 15/00*   (2006.01)
  *H04L 101/375* (2022.01)

(56) References Cited

U.S. PATENT DOCUMENTS

| | | |
|---|---|---|
| 2018/0324632 A1 | 11/2018 | Cho et al. |
| 2018/0332441 A1 | 11/2018 | Shaw et al. |
| 2019/0230726 A1* | 7/2019 | Jin .................. H04W 76/27 |
| 2019/0364492 A1* | 11/2019 | Azizi ................ H04W 48/16 |
| 2020/0366563 A1* | 11/2020 | Patil ................. H04W 24/08 |

* cited by examiner

SYSTEMS AND METHODS FOR PROVIDING LOW LATENCY SERVICES VIA AN EVOLVED PACKET CORE NETWORK

CROSS-REFERENCE TO RELATED APPLICATION

This application is a Continuation of U.S. patent application Ser. No. 16/669,272, filed on Oct. 30, 2019, titled "SYSTEMS AND METHODS FOR PROVIDING LOW LATENCY SERVICES VIA AN EVOLVED PACKET CORE NETWORK," the contents of which are herein incorporated by reference in their entirety.

BACKGROUND

Wireless networks may provide voice and/or data services that may be used by a variety of applications and devices. Autonomous vehicles, robotics, augmented or virtual reality systems, or industrial machinery may be examples of devices that access the voice and/or data services of wireless networks for applications such as autonomous driving, robotic coordination, cloud computing, etc. (e.g., in addition to services such as voice calling, Internet browsing, or media streaming). These different applications and devices may have different requirements with respect to bandwidth, latency, reliability, and/or other factors associated with different services that may be accessed via a wireless network.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may perform pseudo-slicing within a wireless network (e.g., within a Fourth Generation ("4G") wireless network) in order to provide differentiated levels of performance for services that may be requested and/or accessed from the wireless network. Some embodiments may include creating pseudo-slices that provide selective local breakout and/or selective localized execution for a subset of services at distributed Multi-Access Edge Computing ("MEC") locations based on physical proximity to requesting User Equipment ("UEs"), rather than at or through the core network.

The pseudo-slicing may provide the differentiated levels of service and/or execution of services by particular components of the wireless network (e.g., at different physical locations and/or by different sets of devices or network functions) based on request identifiers, Quality-of-Service ("QoS") identifiers, policy identifiers, profile identifiers, and/or other identifiers used for configuring control plane and/or user plane function of the wireless network. For instance, the pseudo-slicing may be based on an Access Point Name ("APN"), QoS Class Identifier ("QCI"), Service Provider Identifier ("SPID"), Allocation and Retention Priority ("ARP"), and/or other identifiers.

In some embodiments, the pseudo-slicing may be adapted for a wireless network that implements a Fifth Generation ("5G") Next Radio ("NR") Non-Standalone Access ("NSA") architecture (e.g., provides connectivity via a 5G radio access technology ("RAT") and one or more other RATs, such as a 4G RAT, a Long-Term Evolution ("LTE") RAT, etc.). In some such embodiments, the core of the wireless network may be enhanced to support connections to base stations that implement wireless connectivity via a 5G RAT, such as 5G-NR gNodeBs ("gNBs"), as well as connections to base stations that implement wireless connectivity via another type of RAT, such as eNodeBs ("eNBs") that provide UEs with connectivity via a 4G RAT. The pseudo-slicing may be extended to leverage the 5G connectivity, and to create one or more pseudo-slices that enable UEs to access services at MEC locations or the core network with the increased bandwidth, speed, and lower latency offered by the 5G connectivity. Accordingly, pseudo-slices may be created to selectively pass user traffic to an external Packet Data Network ("PDN") through the core network or to a nearby MEC location via 5G bearers or via 4G bearers based on a mapping of the identifiers to the different classes of services supported by the network.

Figure 1:
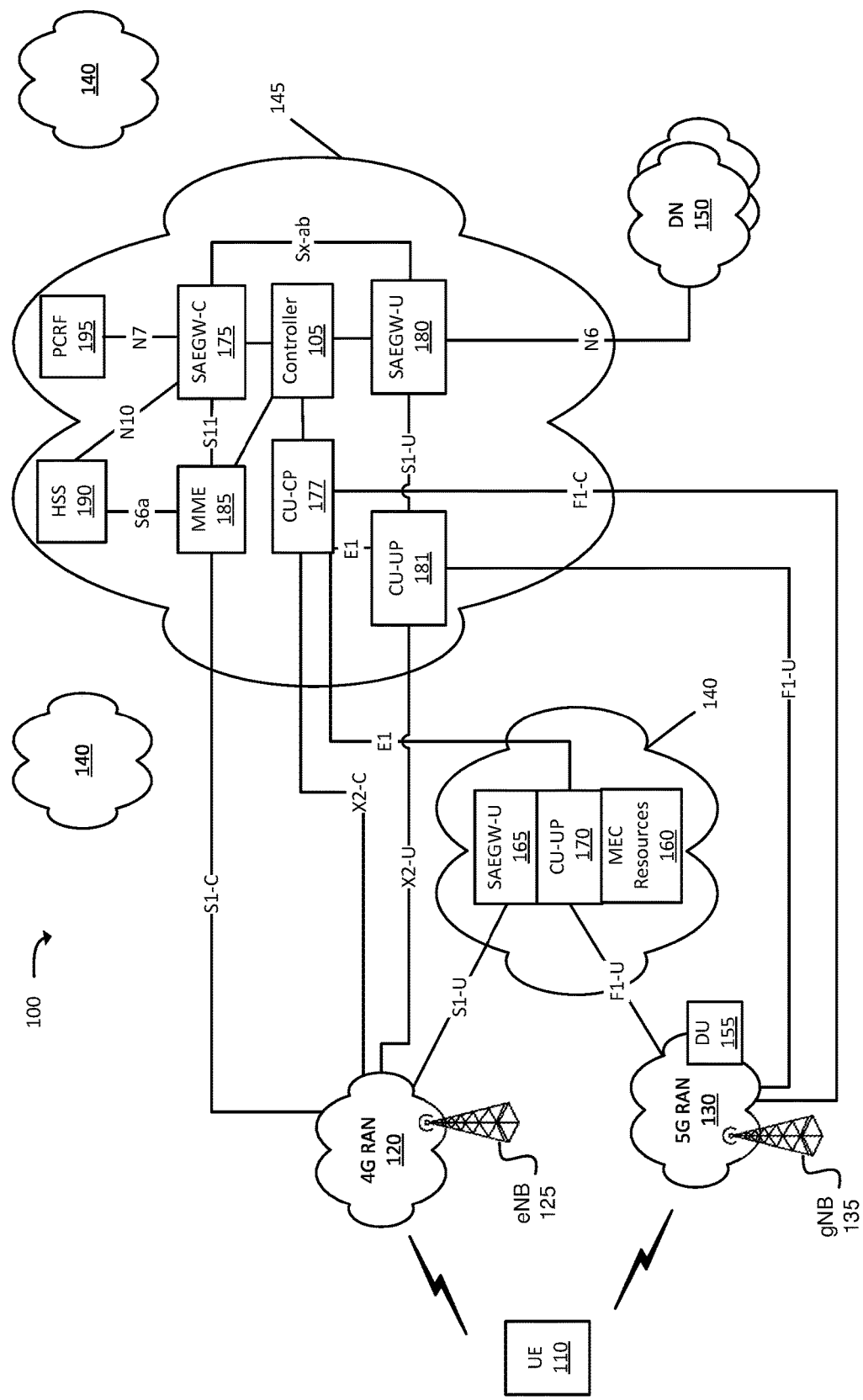
FIG. 1 is a diagram of an example environment in which systems and/or methods described herein may be implemented.

FIG. 1 is a diagram of an example environment 100 in which systems and/or methods described herein may be implemented. In some embodiments, environment 100 may correspond to a network that implements or includes a 5G NSA architecture. As shown, environment 100 may include UE 110, 4G Radio Access Network ("RAN") 120, 5G RAN 130, one or more distributed MEC locations 140, a wireless telecommunication core network 145, and one or more external data networks 150. In practice, one or more other types of RANs may be used in addition to, or in lieu of, 4G RAN 120 (e.g., RANs that implement other RATs). For the sake of simplicity, embodiments described herein are discussed in the context of environment 100 including a 4G RAN. Environment 100 is shown to have a Control and User Plane Separation ("CUPS") architecture, such that control plane and user plane functionality may be separated and/or provided by different devices. In the CUPS architecture, the control plane may include the functions for configuring connectivity and radio resources, and the user plane may include the functions for forwarding user traffic or data packets between different devices or interfaces.

UE 110 may include a portable computing and communication device, such as a personal digital assistant ("PDA"), a "smart" phone, a cellular phone, a laptop computer, a tablet computer, etc. UE 110 may also include a non-portable computing device, such as a desktop computer, a consumer or business appliance, a "smart" television, or another device that has the ability to connect to the wireless telecommunications network. UE 110 may, in some embodiments, include a computing and communication device that may be worn by a user (also referred to as "wearable" devices) such as a watch, a fitness band, a necklace, glasses, a ring, a belt, a headset, and/or another type of wearable device.

4G RAN 120 may include one or more base stations, some or all of which may take the form of eNB 125, that provide 4G radio bearers (e.g., bearers that occupy the 600 MHz-2700 MHz radio frequency ("RF") range) for UE 110 and/or other UEs that have 4G radios and are in range of 4G RAN 120. 5G RAN 130 may include one or more base stations, some or all of which may take the form of gNB 135, that provide 5G radio bearers (e.g., bearers that occupy the 600 MHz-6 GHz RF range, bearers that occupy a 30 GHz-300 GHz RF range (sometimes referred to as "millimeter wave" or "mmWave"), and/or bearers that utilize some other suitable RF range) for UE 110 and/or other UEs that have 5G radios and are in range of 5G RAN 130.

Distributed Unit ("DU") 155 may operate in conjunction with one or more Centralized Units ("CUs") that may be associated with MEC location 140 and/or core network 145. DU 155 may provide 5G control plane and user plane functions that are not performed by the CUs (e.g., may handle traffic processing at lower layers than is handled by CUs).

MEC location 140 may include localized MEC resources 160 that are part of or are physically located near physical components of RANs 120, 130, and/or other RANs (e.g., near one or more eNBs 125, gNBs 135, DUs 155, etc.). In particular, MEC location 140 may be faster to access (e.g., via fewer network hops) from 4G RAN 120 and/or 5G RAN 130 than core network 145. MEC resources 160 may include one or more devices or systems that provide caching resources for localized delivery of content and services, compute resources for localized execution of functions and services, and/or other resources for localized access to services that may be requested and/or accessed by UEs. For instance, MEC resources 160 may be used to provide various services with low latency (e.g., less than about 10 milliseconds) and high reliability to UE 110, because of the geographic proximity of MEC resources 160 to 4G RAN 120 and/or 5G RAN 130 that may be used by UE 110 to request and access services. "Low latency services" may include services that require less than 20 milliseconds of latency. For instance, low latency services may include edge computing services that control autonomous vehicles or robots, and/or other devices or systems operating in real-time. In contrast, "latency insensitive services" may include services that are not affected by latencies greater than 20 milliseconds. For instance, latency insensitive services may include website access, email access, video/streaming access, or the like. Latency insensitive services may be provided using the resources of core network 145 and external data networks 150 without degrading the user experience, whereas MEC resources 160 of MEC location 140 may be limited (e.g., relative to resources of core network 145 and/or external data networks 150), and therefore may be selectively allocated to specific UEs and/or specific services (e.g., low latency services).

In some embodiments, MEC location 140 may include a System Architecture Evolution Gateway ("SAEGW") user plane function ("SAEGW-U") 165 and/or user plane CU ("CU-UP") 170. SAEGW-U 165 may provide Packet Data Network ("PDN") Gateway ("P-GW") and Serving Gateway ("S-GW") 4G user plane functions for MEC location 140. For instance, SAEGW-U 165 may control the user plane traffic coming into and out of MEC location 140 via eNB 125 by establishing the bearers that allow UEs to access services provided by MEC resources 160 of MEC location 140 from 4G RAN 120. In some embodiments, SAEGW-U 165 may be a logical device that represents separate user plane S-GW and P-GW devices operating in MEC location 140. In some embodiments, SAEGW-U 165 may be a single device, system, Virtualized Network Function ("VNF"), etc., that combines the functionality of user plane S-GW and P-GW devices. CU-UP 170 may control 5G user plane functions for MEC location 140 by controlling the user plane traffic coming into and out of MEC location 140 via gNB 135. Accordingly, CU-UP 170 may establish the bearers that allow UE 110 to access services provided by MEC resources 160 of MEC location 140 via 5G RAN 130. In some embodiments, SAEGW-U 165 and CU-UP 170 may be implemented by different devices or systems. In some embodiments, SAEGW-U 165 and CU-UP 170 may be a single device, system, VNF, etc. that performs the 4G and 5G user plane functions.

In some embodiments, core network 145 may be, or may include, an evolved packet core ("EPC") that operates based on a 3rd Generation Partnership Project ("3GPP") wireless communication standard. Core network 145 may include SAEGW control plane function ("SAEGW-C") 175, SAEGW-U 180, Mobility Management Entity ("MME") 185, Home Subscriber Server ("HSS") 190, and Policy and Charging Rules Function ("PCRF") 195. Moreover, when providing NSA 5G access, core network 145 may include Control Plane Centralized Unit ("CU-CP") 177, CU-UP 181, and/or other components that communicate with 5G RAN 130.

SAEGW-C 175 may include one or more devices within core network 145 that control and/or perform control plane functionality for service provided via 4G RAN 120. In particular, SAEGW-C 175 may perform the control plane functions of S-GW and P-GW devices, including directing SAEGW-U 165, SAEGW-U 180, and/or other SAEGW-Us in the establishment of the 4G user plane bearers (e.g., user plane bearers established via 4G RAN 120) as is described below in further detail with reference to FIGS. 6 and 7.

SAEGW-U 180 may create and manage the bearers that are established with eNBs (e.g., eNB 125), and that are used to exchange user plane traffic between the eNBs and the resources, devices, systems, and/or services that are accessible from core network 145 and/or external data networks 150. In the CUPS architecture illustrated by FIG. 1, SAEGW-C 175 and SAEGW-U 180 may operate as separate devices. In some embodiments, SAEGW-C 175 and SAEGW-U 180 may operate as a single device, system, VNF, etc., that performs a logical split of the control plane and user plane functions.

CU-CP 177 may include one or more devices within core network 145 that configure the 5G control plane (e.g., control plane signaling associated with 5G RAN 130). CU-CP 177 may direct CU-UP 170, CU-UP 181, and/or other CU-CPs in the establishment of the 5G user plane bearers (e.g., via 5G RAN 130). In some embodiments, the 4G and 5G control plane functions performed by SAEGW-C 175 and CU-CP 177 may be combined and performed from a single device, system, VNF, etc., that operates in core network 175.

CU-UP 181 may include one or more devices that create and manage the bearers that are established with gNBs (e.g., gNB 135). Accordingly, CU-UP 181 may facilitate the exchange of user plane traffic between gNBs and the resources, devices, systems, and/or services that are accessible from core network 145 and/or external data networks 150.

MME 185 may include one or more computation and communication devices that act as a control node for eNB 125, gNB 135, and/or other devices that provide the air interface for wireless telecommunications network 145. For example, MME 185 may perform operations to register UE 110 with wireless telecommunications network 145, to establish bearer channels associated with a session with UE 110, to hand off UE 110 to a different eNB 125 or gNB 135, MME 185, or another network, and/or to perform other operations.

HSS 190 may include one or more devices that may manage, update, and/or store, in a memory associated with HSS 190, profile information associated with a user or subscriber (e.g., a subscriber associated with UE 110). The profile information may include identifiers (e.g., QCI, SPID, ARP, etc.) that identify applications and/or services that are permitted for and/or accessible by the subscriber, identifying information for UE 110 (e.g., MDN, IMSI, IMEI, etc.), bandwidth or data rate thresholds associated with the applications and/or services, priority class information, and/or other information. Additionally, or alternatively, HSS 190 may perform authentication, authorization, and/or accounting operations associated with the subscriber and/or a communication session with UE 110.

PCRF 195 may include one or more devices that may receive information regarding policies and/or subscriptions from one or more sources, such as subscriber databases and/or from one or more users. PCRF 195 may provide these policies and/or policy identifiers to SAEGW-C 175 or another device so that the policies can be enforced.

The quantity of devices and/or networks, illustrated in FIG. 1, is provided for explanatory purposes only. In practice, environment 100 may include additional devices and/or networks; fewer devices and/or networks; different devices and/or networks; or differently arranged devices and/or networks than illustrated in FIG. 1. For example, while not shown, environment 100 may include devices that facilitate or enable communication between various components shown in environment 100, such as routers, modems, gateways, switches, hubs, etc. Alternatively, or additionally, one or more of the devices of environment 100 may perform one or more functions described as being performed by another device of environment 100. Additionally, the devices of environment 100 may interconnect with each other, and/or other devices, via wired connections, wireless connections, or a combination of wired and wireless connections. In some embodiments, one or more devices of environment 100 may be physically integrated in, and/or may be physically attached to, one or more other devices of environment 100. Also, while "direct" connections are shown in FIG. 1 between certain devices, some devices may communicate with each other via one or more additional devices and/or networks.

In some embodiments, pseudo-slicing may be implemented by controller 105 that operates within core network 145. Controller 105 may be a distributed device that includes or is integrated as part of one or more devices or components of core network 145 that perform control plane and/or user plane configuration and/or control. For instance, in some embodiments, controller 105 may run as part of one or more of MME 185, SAEGW-C 175, and/or CU-CP 177. In some embodiments, controller 105 may run in conjunction with other devices or components of core network 145, or may run as a standalone device or component of core network 145.

Figure 2:
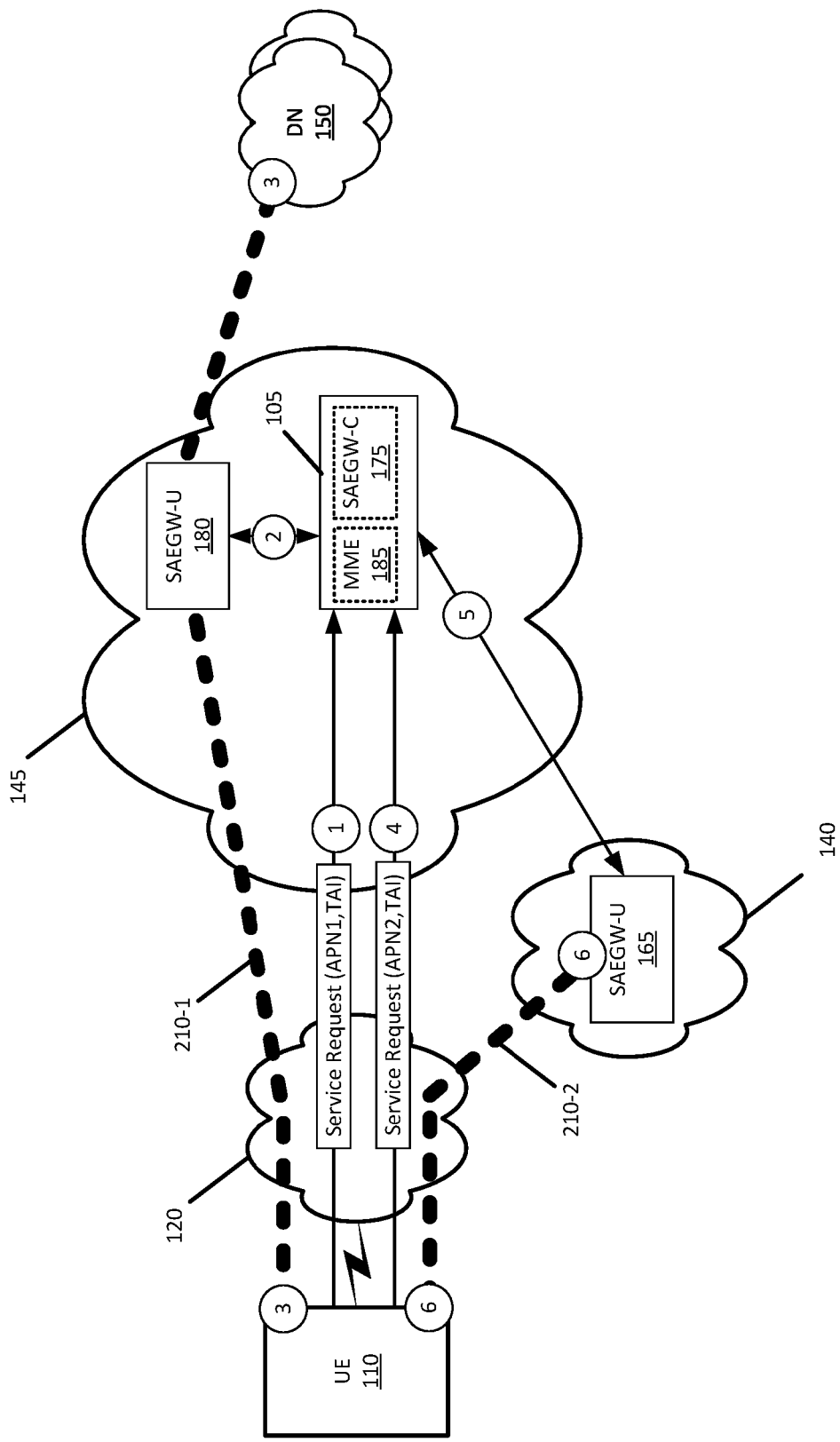
FIG. 2 illustrates an example of performing pseudo-slicing for differentiated localized and remote services based on a service request identifier in accordance with some embodiments presented herein.

FIG. 2 illustrates an example of performing pseudo-slicing for differentiated localized and remote services based on a service request identifier in accordance with some embodiments presented herein. In particular, FIG. 2 illustrates controller 105 creating two pseudo-slices 210-1 and 210-2 (sometimes referred to individually as "pseudo-slice 210" or collectively as "pseudo-slices 210") to provide different user plane sessions and/or connections with which UE 110 may access different services with different levels of performance.

In the example embodiment shown in FIG. 2, controller 105 may be implemented to run in conjunction with, or as part of, MME 185 and/or SAEGW-C 175. UE 110 may connect to core network 145 via RAN 120, and may request access to one or more services via MME 185 functionality provided by controller 105. For instance, UE 110 may issue (at 1) a first service request (e.g., a PDN connectivity request message) with a first service identifier and/or location identifier to controller 105. The first service identifier may correspond to a first APN. The location identifier may correspond to a Tracking Area Identity ("TAI") and/or E-UTRAN Cell Global Identifier ("ECGI") that can be used to identify the location of UE 110.

Controller 105 may receive (at 1) the service request, and may determine that the first service identifier is associated with a first class of service. The determination may be based on controller 105 storing a mapping between different service identifiers, profile identifiers, and/or other identifiers and different classes of services (e.g., latency sensitive services, latency insensitive services, etc.). In this example, the first class of service may correspond to latency insensitive services (e.g., enhanced Mobile Broadband ("eMBB") services and/or other services that may be considered "latency insensitive") that are accessed from external data network 150. As discussed herein, network components of core network 145 may be configured to treat traffic, associated with UE 110, according to one or more QoS levels based on the class of service indicated in the service request from UE 110.

Based on identifying that the first service identifier, included in the service request, is associated with a latency insensitive service, controller 105 may provide messaging or instructions to SAEGW-U 180, to cause SAEGW-U 180 to create first pseudo-slice 210-1. For instance, controller 105 may instruct (at 2) SAEGW-U 180 to establish the bearers for the one or more sessions and/or connections via which UE 110 may access (at 3) the first class of services from external data network 150. Controller 105 may use standardized EPC messages, such as a Packet Forwarding Control Procedure ("PFCP") session establishment message, to initiate the bearer establishment procedure. As shown here, SAEGW-U 180 may be located in, or otherwise associated with, core network 145 (e.g., may be selected without regard for geographic or physical proximity to UE 110), and thus may be selected by controller 105 by virtue of the first service request corresponding to a latency insensitive service.

SAEGW-U 180 may establish bearers between eNB 125 of RAN 120 and the P-GW function of SAEGW-U 180, and may assign a bearer identifier to identify the established bearer context for first pseudo-slice 210-1. In some embodiments, the bearer identifier may correspond to an Internet Protocol ("IP") address and/or another address. SAEGW-U 180 may return the bearer identification information to controller 105, and controller 105 may provide messaging for eNB 125 to link the radio bearer established with UE 110 to the bearer established between eNB 125 and SAEGW-U 180, thereby creating an Evolved Packet System ("EPS") bearer between UE 110 and SAEGW-U 180 that is represented by first pseudo-slice 210-1.

Once first pseudo-slice 210-1 is created, controller 105 may provide UE 110 with the bearer identifier and/or other addressing that is associated with the EPS bearer for first pseudo-slice 210-1. UE 110 may use the bearer identifier and/or other addressing to transmit (at 3) data packets for sessions pertaining to the latency insensitive or eMBB services through first pseudo-slice 210-1. For example, UE 110 may encapsulate traffic into packets that are addressed to SAEGW-U 180, and SAEGW-U 180 may forward the packets to their intended destination (e.g., to one or more resources via core network 145 and/or external data network 150). The encapsulated traffic may include an IP address and/or other identifier of the intended recipient of the traffic. In some embodiments, SAEGW-U 180 may perform network address translation ("NAT"), decapsulation of the encapsulated traffic, and/or some other suitable functionality to forward the traffic to its intended destination.

UE 110 may issue (at 4) a second service request (e.g., a second PDN connectivity request) with a different second service identifier and/or the same location identifier to controller 105. The second service request may be sent while UE 110 is engaged in active communication via pseudo-slice 210-1, and/or while one or more bearers associated with pseudo-slice 210-1 are active. In some embodiments, the second service request may be sent while UE 110 is not engaged in active communication via pseudo-slice 210-1, and/or while no other bearers associated with UE 110 are active.

Controller 105 may determine that the second service identifier corresponds to a second APN, and that the second service identifier and/or second APN maps to a different second class of service for low latency or Ultra-Reliable Low Latency Communication ("URLLC") services. Accordingly, controller 105 may determine that some or all of the user plane functionality to provide the second class of service should be provided via a MEC location that is selected based on physical or geographical proximity to UE 110 (e.g., a closest MEC location). In some embodiments, controller 105 may obtain a subscriber profile, QoS profile, policy profile, and/or other data to verify whether UE 110 is authorized to access a particular requested service or the second class of service from a MEC location. If UE 110 is not authorized, controller 105 may default to providing the requested service from core network 145 and/or pseudo-slice 210-1 with the first class of service. In this example, controller 105 may determine that UE 110 is authorized to receive the second class of service and/or is authorized to access the requested service from a MEC location.

Controller 105 may identify MEC location 140 as the closest MEC location from which UE 110 may access low latency services based on the location identifier that is included with the second service request. In some embodiments, controller 105 may use proximity of MEC location 140 to UE 110 as one factor in selecting MEC location 140 from a set of candidate MEC locations. For example, MEC location 140 may not be the closest MEC location to UE 110, but the closest MEC location to UE 110 may be overloaded, may be associated with lower performance metrics than MEC location 140, and/or MEC location 140 may otherwise be more suitable for providing the requested service to UE 110.

In some embodiments, controller 105 may store a mapping of TAIs, ECGIs, and/or other location identifiers to different MEC locations from which low latency services may be accessed. More specifically, controller 105 may store a mapping of TAIs, ECGIs, and/or other location identifiers to addressing for a respective SAEGW-U that controls the user plane function at each MEC location. Controller 105 may instruct (at 5) SAEGW-U 165 at MEC location 140 to establish the bearers for the one or more sessions and/or connections by which UE 110 may access (at 6) the low latency services directly from MEC resources 160 at MEC location 140 rather than the larger number of network hops needed to access services from resources in core network 145 or external data network 150.

SAEGW-U 165 may establish bearers between eNB 125 of RAN 120 and the P-GW function of SAEGW-U 165, and may assign a second bearer identifier and/or other addressing (e.g., a second IP address) for identifying the established bearer context for second pseudo-slice 210-2. Controller 105 may receive the identifier information from SAEGW-U 165, and may provide additional messaging for eNB 125 to link the radio bearer established with UE 110 to the bearer established between eNB 125 and SAEGW-U 165, thereby creating the EPS bearer that is represented by second pseudo-slice 210-2.

Once the bearers for second pseudo-slice 210-2 are established, controller 105 may provide UE 110 with the second bearer identifier and/or other addressing. UE 110 may use the provided addressing to transmit (at 6) data packets for sessions pertaining to the low latency services through second pseudo-slice 210-2. The P-GW function of SAEGW-U 165 may provide the interface that exchanges data packets between the EPS bearer of second pseudo-slice 210-2 and MEC resources 160 in MEC location 140.

Figure 3:
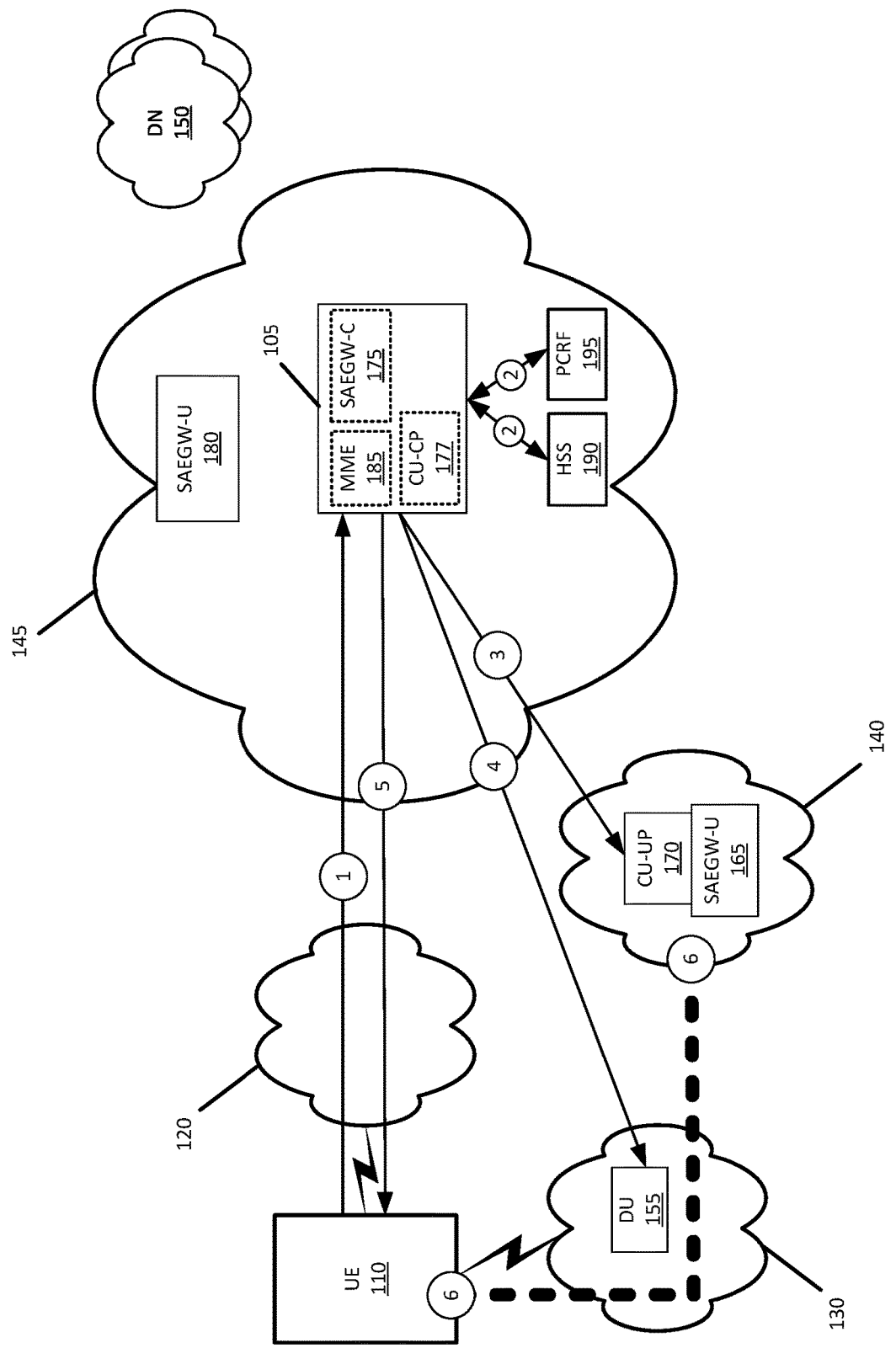
FIG. 3 illustrates an example of using a profile identifier to create a pseudo-slice that facilitates connectivity via a Fifth Generation ("5G") radio access technology ("RAT") in a 5G Non-Standalone Access ("NSA") environment, in accordance with some embodiments presented herein.

FIG. 3 illustrates an example of using a profile identifier to create a pseudo-slice that leverages 5G connectivity in a network that implements a 5G NSA architecture, in accordance with some embodiments presented herein. As shown in FIG. 3, controller 105 may assume part or full control over the 5G control plane by including and/or incorporating CU-CP 177 functionality.

UE 110 may issue (at 1) a service request through 4G RAN 120 to controller 105. In this example, the service request may include a location identifier (e.g., TAI) and/or a service identifier (e.g., APN). In some embodiments, the service request may not include a location identifier or a service identifier. In some such embodiments, the location of UE 110 may be obtained via Global Positioning System ("GPS") tracking, network triangulation, or location tracking provided by other components of core network 145. The alternative location tracking may be performed in response to consent provided by the user of UE 110 or based on configuration settings of UE 110.

Controller 105 may obtain (at 2) a subscriber profile, policy profile, QoS profile, and/or other profiles for UE 110 from HSS 190 and/or PCRF 195. The obtained profile may include a profile identifier. The profile identifier may include a QCI, SPID, ARP, and/or other identifier that defines one or more classes of service that may be provided to UE 110.

Controller 105 may map values for different profile identifiers to different classes of service. In this example, the profile identifier from the obtained profile may map to low latency services that can be accessed from a nearest MEC location (e.g., MEC location 140) via 5G connectivity.

Based on the mapping of the profile identifier and/or the location identifier, controller 105 may identify MEC location 140 as the nearest MEC location to UE 110, and/or may otherwise select MEC location 140 based on proximity and/or performance of MEC location 140. Controller 105 may identify the addressing for CU-UP 170 in MEC location 140 based on a mapping of different location identifiers to addressing for different CU-UPs at different MEC locations.

Controller 105 may instruct (at 3) CU-UP 170 to establish the bearers for the one or more sessions and/or connections by which UE 110 may access (at 6) low latency services from MEC location 140 via the 5G signaling. In response, CU-UP 170 may establish bearers with gNB 135 of 5G RAN 130, and may assign a bearer identifier and/or other addressing (e.g., an IP address) to identify the established bearer context. CU-UP 170 may return the identifier and/or addressing information to controller 105.

Controller 105 may provide (at 4) messaging to gNB 135 and/or DU 155 in 5G RAN 130 to provision radio resources (e.g., create 5G radio bearers) for the 5G connectivity. Upon confirming the creation of the bearer(s) and/or allocation of the radio resources at 5G RAN 130, controller 105 may provide (at 5) messaging to UE 110 via 4G RAN 120 to notify UE 110 that it may connect to 5G RAN 130, and access (at 6) low latency services from MEC location 140 with 5G connectivity using the IP address for the established user plane.

Figure 4:
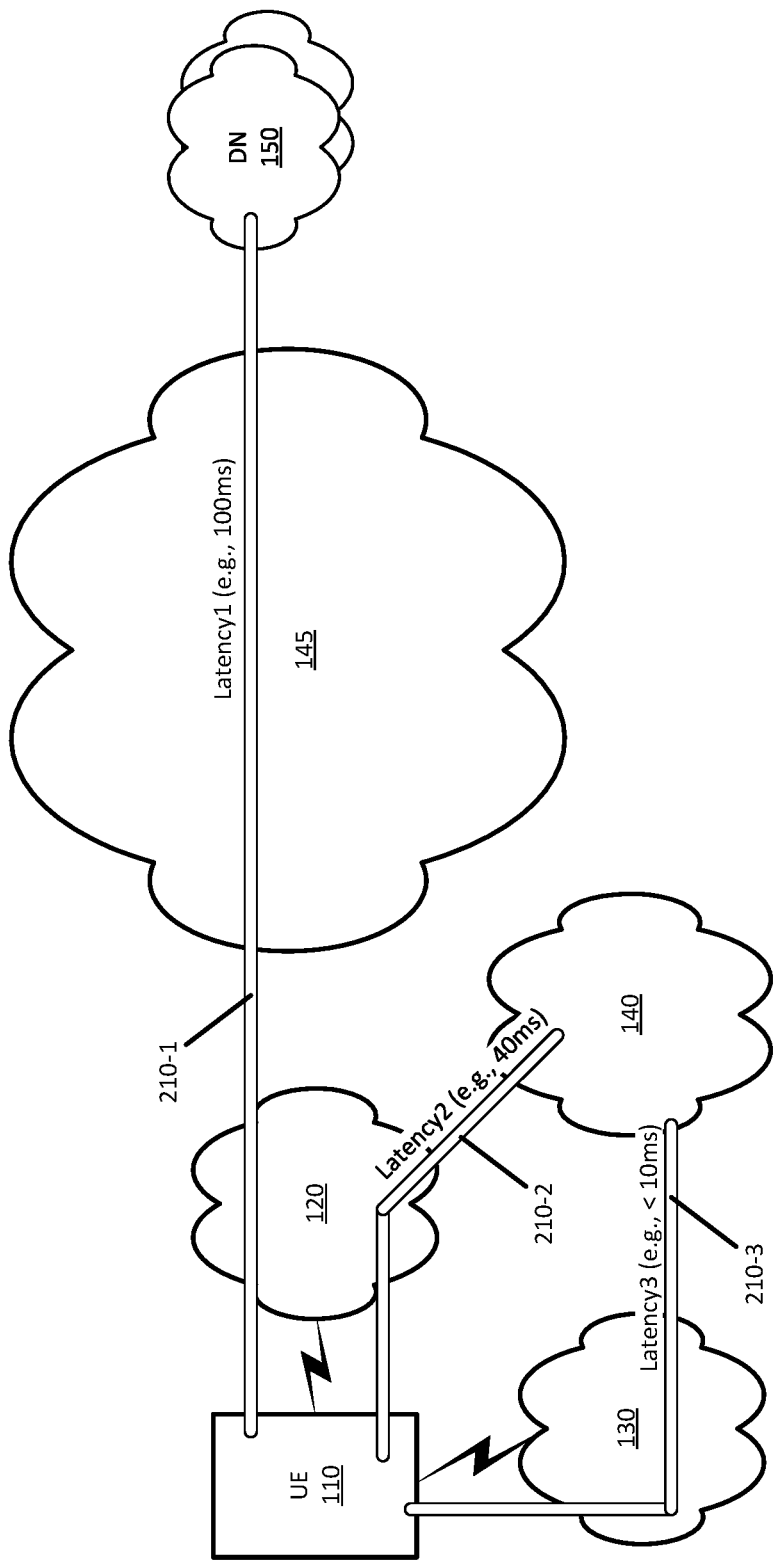
FIG. 4 illustrates examples of different performance metrics that may be associated with accessing services using connections or sessions established on different pseudo-slices in accordance with some embodiments presented herein.

FIG. 4 illustrates examples of different performance metrics that may be associated with accessing services using connections or sessions established on different pseudo-slices in accordance with some embodiments presented herein. FIG. 4 may include pseudo-slices 210-1 and 210-2 that may have been created by controller 105 in FIG. 2, and pseudo-slice 210-3 that may have been created by controller 105 in FIG. 3. Specifically, pseudo-slice 210-1 may be created as a result of controller 105 mapping a first set of identifiers (e.g., APN, QCI, ARP, SPID, other service request identifier, and/or other profile identifiers), that are used in core network 145 for existing control plane and/or user plane configuration, to a first class of service for passing user plane traffic between UE 110 and external data network 150 through core network 145 via 4G RAN 120. Similarly, controller 105 may map a second set of identifiers, that are used in core network 145 for existing control plane and/or user plane configuration, to a second class of service for passing user plane traffic between UE 110 and MEC location 140 via RAN 120, and may map a third set of identifiers, that are used in core network 145 for existing control plane and/or user plane configuration, to a third class of service for passing user plane traffic between UE 110 and MEC location 140 via 5G RAN 130.

Controller 105 may create pseudo-slice 210-1 to provide access to eMBB and/or latency insensitive services. Traffic that is exchanged between UE 110 and data network 150 via pseudo-slice 210-1 may experience the greatest latency (e.g., 100 milliseconds average latency) out of the three example pseudo-slices 210 shown, which may be due to the number of network hops that are traversed (and/or other factors) for the data to pass through core network 145 to a node within external network 150.

Controller 105 may create pseudo-slice 210-2 to provide access to low latency services from MEC resources 160 in MEC location 140 via RAN 120. Traffic that is exchanged between UE 110 and MEC location 140 may traverse fewer network hops than traffic that is exchanged between UE 110 and external data network 150 (e.g., via pseudo-slice 210-1). As a result, UE 110 may experience less latency when accessing services via pseudo-slice 210-2 than pseudo-slice 210-1.

Controller 105 may create pseudo-slice 210-3 to provide access to low latency services from MEC resources 160 in MEC location 140 using the greater bandwidth and/or latency provided by RAN 130. Moreover, the connectivity via RAN 130 may provide URLLC features to further reduce latency in traffic that is exchanged between UE 110 and MEC resources 160 in MEC location 140. Consequently, UE 110 may experience less latency when accessing services via pseudo-slice 210-3 than pseudo-slices 210-1 and 210-2.

Figure 5:
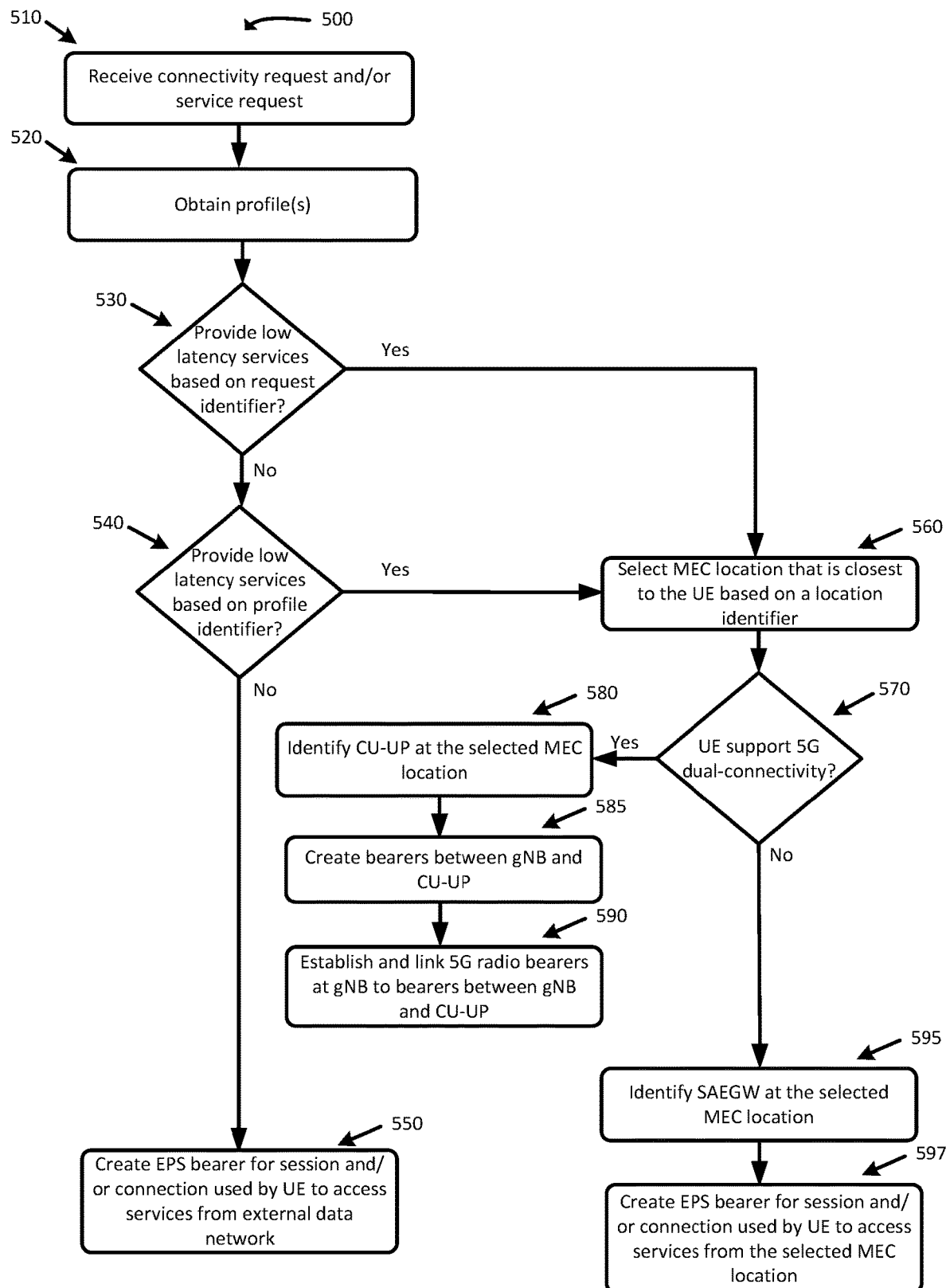
FIG. 5 presents a process for generating pseudo-slices in a 5G NSA environment based on different identifiers in accordance with some embodiments presented herein.

FIG. 5 presents a process 500 for generating pseudo-slices in network that implements a 5G NSA architecture based on different identifiers in accordance with some embodiments presented herein. Process 500 may be implemented by controller 105.

Process 500 may include receiving (at 510) a request to connect and/or access services. The request may be a PDN connectivity request for requesting the setup of a default bearer to an APN identified by APN identifier that is included with the request.

Process 500 may include obtaining (at 520) one or more profiles (e.g., subscriber profile, policy profile, QoS profile, etc.) associated with requesting UE 110. Controller 105 may obtain (at 520) the profile from HSS 190, PCRF 195, and/or another component of the EPC (e.g., core network 145). The profile may include one or more identifiers that define different classes of service that may be accessed by requesting UE 110. In some embodiments, controller 105 may forgo obtaining (at 520) the profile information. For example, the request (received at 510) may include information that may be used by controller 105 (e.g., in subsequent operations described herein) to establish one or more pseudo-slices to provide connectivity to UE 110.

Process 500 may include determining (at 530) whether UE 110 is permitted to access low latency services from a nearby MEC location based on a service request identifier that may be included with the received (at 510) request. For instance, controller 105 may extract an APN from the request, may verify that UE 110 is authorized to access services based on the extracted APN and/or obtained (at 520) profile information, and may determine if the extracted APN maps to a differentiated class of service for accessing low latency services from a nearby MEC location (e.g., MEC location 140) instead of from external data network 150. In some embodiments, controller 105 stores a mapping table that maps different service request identifiers (e.g., APNs) to different classes of service.

In response to determining (at 530—No) that UE 110 is not permitted to access low latency services from a nearby MEC location based on the service request identifier, process 500 may include determining (at 540) whether UE 110 is permitted to access low latency services from a nearby MEC location based on a profile identifier. In some embodiments, controller 105 stores a mapping table that maps different profile identifiers (e.g., SPID, QCI, ARP, etc.) to the different classes of service.

In response to determining (at 540—No) that UE 110 is not permitted to access low latency services from a nearby MEC location based on a profile identifier, process 500 may include creating (at 550) one or more sessions and/or connections with which UE 110 may access services from and/or exchange data with external data network 150. For instance, controller 105 may determine that UE 110 is permitted to access a first class of service, that corresponds to latency insensitive or eMBB services, via external data network 150 based on one or more of the service request identifier and/or profile identifiers. Controller 105 may store a mapping that maps the first class of service to addressing for SAEGW-U 180 that controls the user plane function in core network 145. Controller 105 may provide messaging to SAEGW-U 180 to create (at 550) the EPS bearer for one or more sessions and/or connections with which UE 110 may access services from external data network 150 (e.g., bearer (s) for passing user plane traffic between UE 110 and SAEGW-U 180 through eNB 125).

In response to determining (at 530—Yes or 540—Yes) that UE 110 is permitted to access low latency services from a nearby MEC location, process 500 may include selecting (at 560) MEC location 140. The selection may be based on proximity of MEC location 140 to UE 110 and/or MEC location 140 performance to RAN 120 or RAN 130. Controller 105 may use a location identifier that is provided with the received (at 510) request, obtained upon UE registration, and/or otherwise obtained via tracking UE 110 to identify MEC location 140. For instance, the selection (at 560) may be based on the TAI, ECGI, and/or other location identifier. In some embodiments, controller 105 stores a mapping table that maps different service request identifier and location identifier combinations (e.g., APN and TAI values) or different profile identifier and location identifier combinations (e.g., QCI/ARP/SPID and TAI values) to addressing for different gateways that control user plane functions (e.g., CU-UPs and SAEGW-Us) in different MEC locations.

Process 500 may include determining (at 570) whether UE 110 supports 5G dual-connectivity and/or is authorized for 5G connectivity. The connectivity permissions for UE 110 may be stored in the obtained (at 520) profile and/or obtained during UE registration.

In response to determining (at 570—Yes) that UE 110 is authorized for 5G connectivity, process 500 may include identifying (at 580) addressing for CU-UP 170 that controls the 5G user plane function at selected MEC location 140. In some embodiments, controller 105 may identify (at 580) the addressing for CU-UP 170 based on the mapping of different identifier combinations to the addressing of different CU-UPs at different MEC locations. Process 500 may include creating (at 585) the bearers between gNB 135 at 5G RAN 130 and CU-UP 170 at MEC location 140 (e.g., the bearers for passing user plane traffic between gNB 135 and CU-UP 170), and establishing (at 590) a radio bearer to link to the bearer created (at 585) between gNB 135 and CU-UP 170, thereby creating the EPS bearer for UE 110 to access services from MEC location 140 via 5G RAT.

In response to determining (at 570—No) that UE 110 is not authorized for 5G connectivity, process 500 may include identifying (at 595) SAEGW-U 165 that controls the 4G user plane function at selected MEC location 140. Here again, controller 105 may identify (at 595) the addressing for SAEGW-U 165 based on the mapping of different identifier combinations to the addressing of different SAEGWs at different MEC locations. Process 500 may include creating (at 597) the EPS bearer for one or more sessions and/or connections with which UE 110 may access services from MEC location 140 (e.g., bearer(s) for passing user plane traffic between UE 110 and SAEGW-U 165 through eNB 125).

Figure 6:
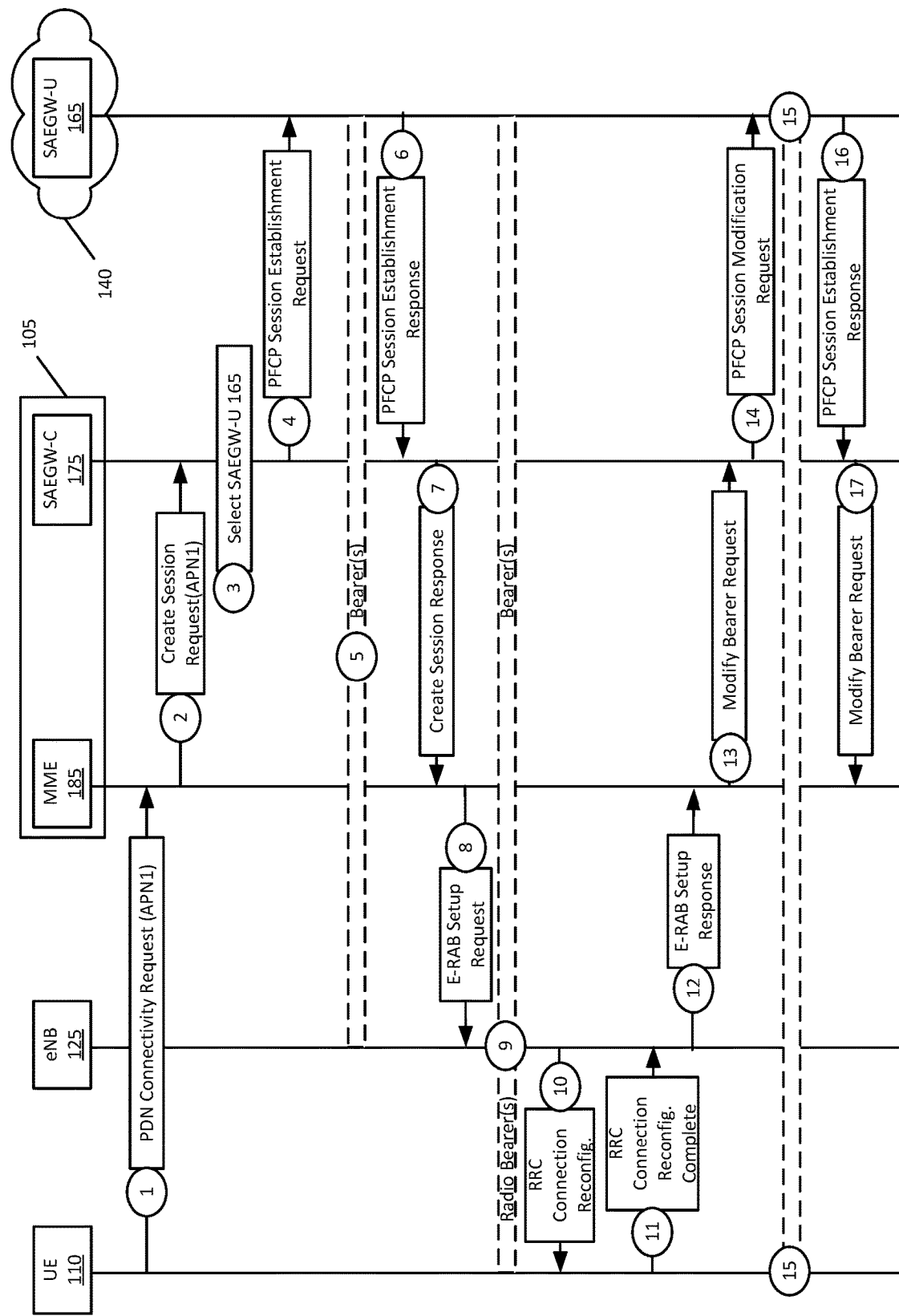
FIG. 6 presents a message exchange diagram for creating pseudo-slices in accordance with some embodiments.

FIG. 6 presents a message exchange diagram for creating pseudo-slices in accordance with some embodiments. Specifically, FIG. 6 illustrates messages exchanged between UE 110, eNB 125, controller 105, and SAEGW-U 165 operating in MEC location 140. In this example, controller 105 may operate as part of MME 185 and SAEGW-C 175 in core network 145.

As shown, UE 110 may provide (at 1) a PDN Connectivity Request message to initiate the establishment of a bearer context activation procedure. The PDN Connectivity Request message may include an APN and one or more location identifiers (e.g., TAI, ECGI, etc.). In this example, the specified APN is associated with low latency services that may be provided from a MEC location.

MME 185 may receive (at 1) the PDN Connectivity Request message. MME 185 may update the location of UE 110 in HSS 190 (not shown) based on the included location identifiers, and/or may obtain a subscriber profile for UE 110 from HSS 190 (not shown). The profile may include one or more identifiers for different classes of service that UE 110 is authorized to receive.

MME 185 may provide (at 2) a Create Session Request message to SAEGW-C 175. The Create Session Request message may be used to establish the default bearer at SAEGW-C 175. The Create Session Request message may include the APN from the PDN Connectivity Request message.

In response to the Create Session Request message, SAEGW-C 175 may create a new entry in an EPS bearer table, may determine that the APN is used to request low latency services from a MEC location, and/or may select (at 3) SAEGW-U 165 in MEC location 140 to establish the EPS bearer that will allow UE 110 to exchange user traffic with MEC resources 160 at MEC location 140. The selection (at 3) of SAEGW-U 165 may be based on a mapping of the request APN and/or location identifier to the network address of SAEGW-U 165.

SAEGW-C 175 may perform a PFCP session establishment procedure with SAEGW-U 165 to setup a PFCP session between the control plane function and the user plane function, and to begin creation of the bearer that will allow UE 110 to exchange data with MEC resources 160 in MEC location 140 via SAEGW-U 165. For instance, SAEGW-C 175 may provide (at 4) a PFCP Session Establishment Request message to establish a new PFCP session context in SAEGW-U 165. Establishing the PFCP Session context may include creating (at 5) the default bearer between SAEGW-U 165 and eNB 125, and/or assigning a bearer identifier and/or address for the terminating endpoint of the bearer at SAEGW-U 165. In some embodiments, the address for the endpoint may be identified with a Tunnel Endpoint Identifier ("TED"), an IP address, and/or a port number.

SAEGW-U 165 may provide (at 6) a PFCP Session Establishment Response message to SAEGW-C 175 in response to having successfully created the PFCP session context. The PFCP Session Establishment Response message may include the bearer identifier and/or addressing for reaching SAEGW-U 165 via the created bearer.

SAEGW-C 175 may provide (at 7) a Create Session Response message to MME 185. The Create Session Response message may include the addressing information from the PFCP Session Establishment Request and/or an EPS bearer identity. The EPS bearer identify may be used to identify the EPS bearer that provides the user plane connecting UE 110 to SAEGW-U 165.

MME 185 may provide (at 8) an EPS Radio Access Bearer ("E-RAB") Setup Request message to eNB 125. In response to the E-RAB Setup Request message, eNB 125 may connect and/or link (at 9) the bearer that is established between SAEGW-U 165 and eNB 125 with the radio bearer(s) used by UE 110 to attach and/or connect to eNB 125.

eNB 125 may issue (at 10) a Radio Resource Control ("RRC") Connection Reconfiguration message to UE 110. The RRC Connection Reconfiguration message may be a command to modify the RRC connection between UE 110 and eNB 125, and may be used to activate at UE 110, the EPS bearer by which UE 110 may directly access MEC location 140. UE 110 may return (at 11) an RRC Connection Reconfiguration Complete to eNB 125.

eNB 125 may confirm that the EPS bearer is formed, as a result of linking the radio bearer with the bearer to MEC location 140, by providing (at 12) an E-RAB Setup Response message to MME 185. MME 185 may provide (at 13) a Modify Bearer Request message to SAEGW-C 175. The Modify Bearer Request message may include the EPS bearer identity, and may cause SAEGW-C 175 to activate the transfer of user traffic over the established EPS bearer by providing (at 14) a PFCP Session Modification Request to SAEGW-U 165. In response to the PFCP Session Modification Request, SAEGW-U 165 may activate (at 15) the transfer of user traffic over the EPS bearer, and SAEGW-U 165 may provide (at 16) a PFCP Session Modification Response once the EPS bearer has been activated. SAEGW-C 175 may complete the process by providing (at 17) a Modify Bearer Response message to MME 185.

Figure 7:
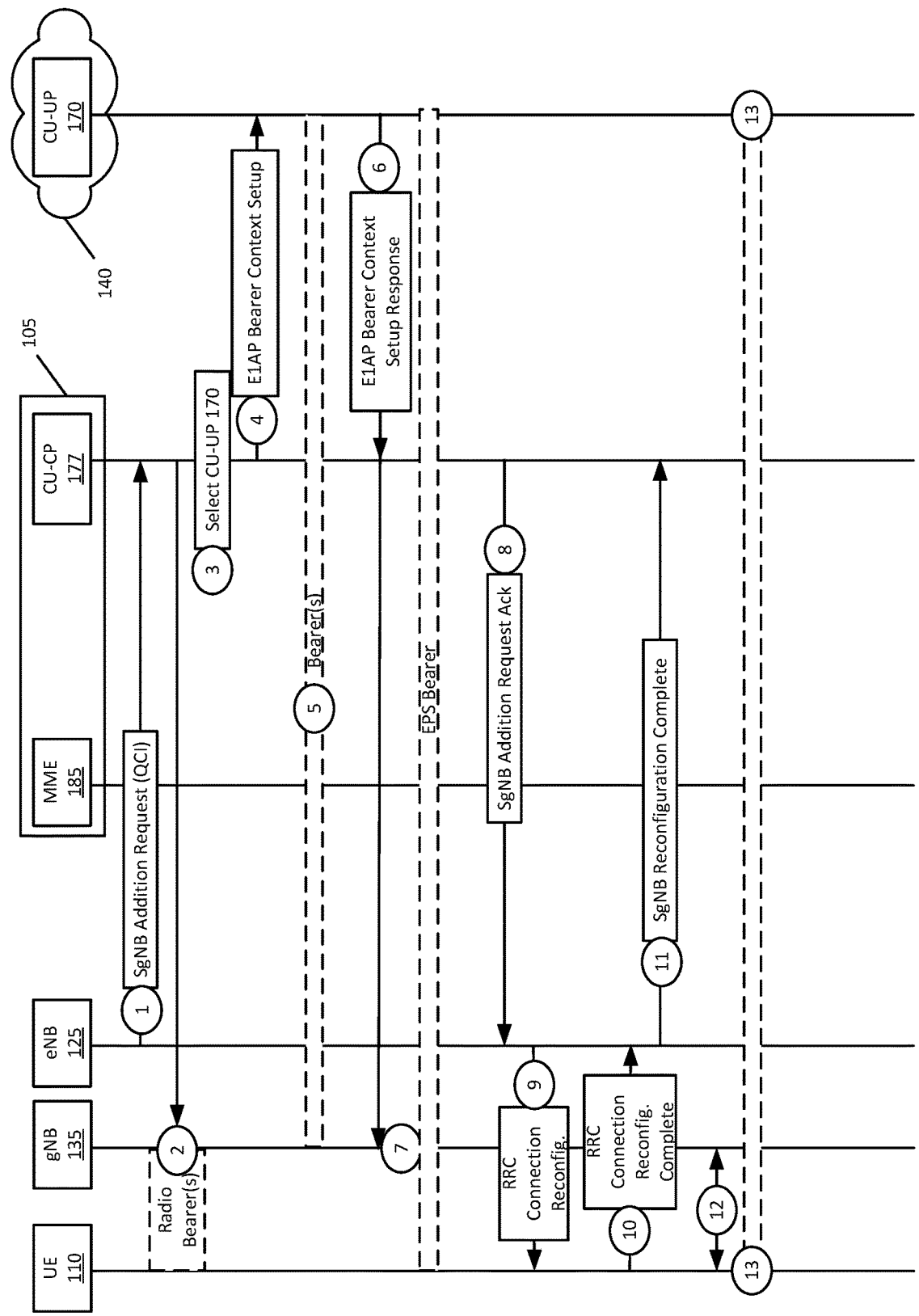
FIG. 7 presents a message exchange diagram for creating a pseudo-slice for accessing low latency services via 5G connectivity in accordance with some embodiments presented herein.

FIG. 7 presents a message exchange diagram for creating a pseudo-slice for accessing low latency services via 5G connectivity in accordance with some embodiments presented herein. FIG. 7 illustrates messages exchanged between UE 110, eNB 125, gNB 135, controller 105, and CU-UP 170 operating in MEC location 140. In this example, controller 105 may operate as part of MME 185 and CU-CP 177 in core network 145.

To provide UE 110 with dual connectivity (e.g., 4G and 5G connectivity), eNB 125 may submit (at 1) an SgNB Addition Request message to CU-CP 177. The SgNB Addition Request message may include a profile identifier (e.g., QCI value) to indicate that a bearer for the 5G connection should be established with a MEC location in order to access low latency services from that MEC location via the 5G connectivity.

CU-CP 177 may receive (at 1) the SgNB Addition Request message. In response to the SgNB Addition Request message, CU-CP 177 may verify if UE 110 is authorized for 5G connectivity. If UE 110 is authorized for 5G connectivity, CU-CP 177 may activate (at 2) a radio bearer at gNB 135. Moreover, CU-CP 177 may select (at 3) CU-UP 170 that controls the 5G user plane function in MEC location 140 based on a stored mapping of the profile identifier and/or location identifier for UE 110 to an address of CU-UP 170. CU-CP may provide (at 4) an E1AP Bearer Context Setup Request message to CU-UP 170.

In response to the E1AP Bearer Context Setup Request message, CU-UP 170 may establish a new bearer context. In particular, CU-UP 170 may create (at 5) a bearer CU-UP 170 and gNB 135, and/or may assign an address for the terminating endpoint of the bearer at CU-UP 170. CU-UP 170 may provide (at 6) an E1AP Bearer Context Setup Response message to CU-CP 177 upon creating the bearer context. The E1AP Bearer Context Setup Response message may include the bearer identifier and/or address that is allocated by CU-UP 170 to the established bearer.

CU-CP 177, via control over gNB 135, may connect and/or link (at 7) the bearer that is established between CU-UP 170 and gNB 135 with the radio bearer for attaching and/or connecting UE 110 to gNB 135. CU-CP 177 may provide (at 8) an SgNB Addition Request Ack message to eNB 125, and eNB 125 may provide (at 9) an RRC Connection Reconfiguration message to UE 110.

The RRC Connection Reconfiguration message may notify UE 110 about the 5G radio bearer that is now part of bearer providing direct connectivity from gNB 135 to MEC location 140. UE 110 may reconfigure radio parameters to connect to gNB 135, and may provide (at 10) the configuration parameters in an RRC Connection Reconfiguration Complete message to eNB 125. eNB 125 may forward (at 11) the configuration parameters to CU-CP 177 via an SgNB Reconfiguration Complete message. UE 110 may perform (at 12) a Random Access Procedure to connect to the network via gNB 135, and to begin transferring (at 13) user plane traffic to MEC location 140 via the established 5G connectivity.

Figure 8:
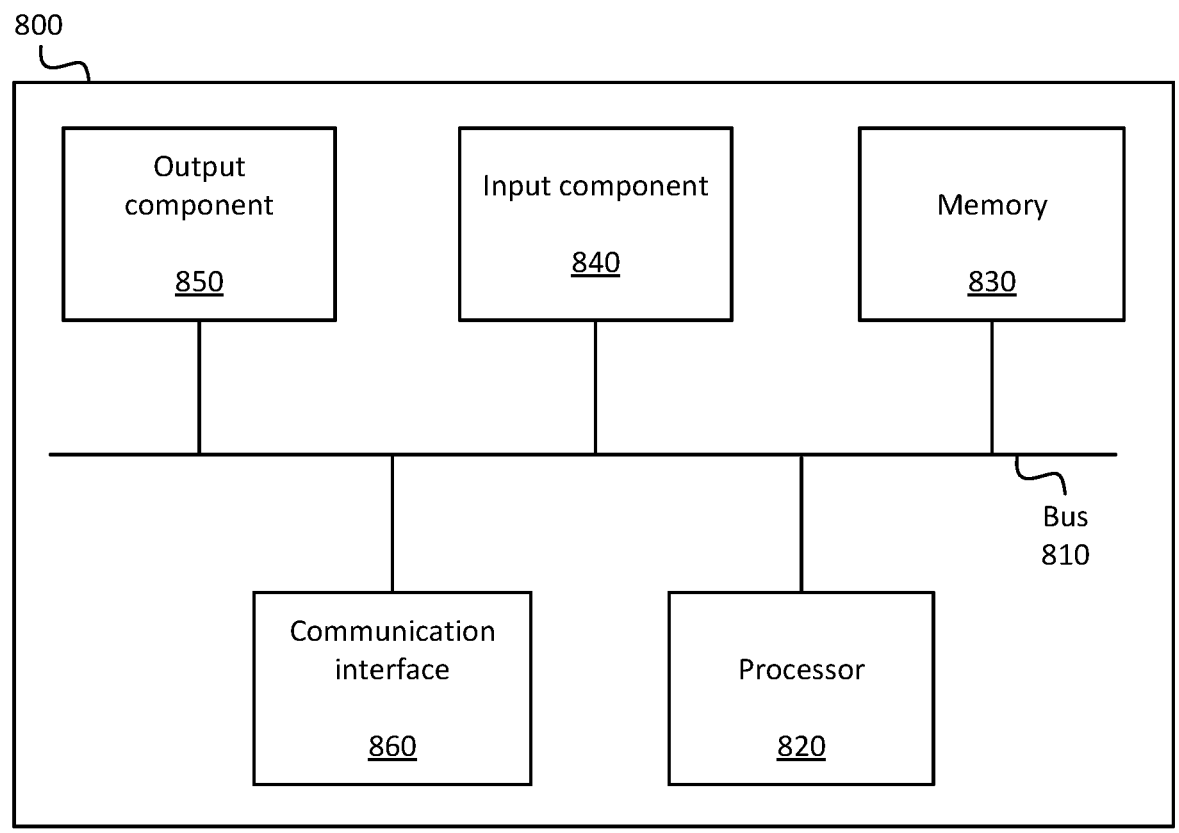
FIG. 8 illustrates example functional components of one or more devices, in accordance with one or more embodiments described herein.

FIG. 8 illustrates example components of device 800. One or more of the devices described above may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 2, 3, and 5-7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
identify a first request, associated with a User Equipment ("UE"), to access a first service from a wireless network that includes a core network and a plurality of Multi-Access/Mobile Edge Computing ("MEC") devices that are each communicatively coupled to a respective base station of the wireless network, wherein each base station implements one or more respective radio access technologies ("RATs");
determine that the requested first service is associated with a particular category of services;
determine that the UE implements a particular RAT;
select a particular MEC device, from the plurality of MEC devices, based on determining that the UE implements the particular RAT, and further based on determining that the MEC device is communicatively coupled to a particular base station that implements the particular RAT;
establish a first communication session between the UE and the selected particular MEC device via the particular base station based on determining that the requested first service is associated with the particular category of services;
identify a second request, associated with the UE, to access a second service from the wireless network;
determine that the requested second service is not associated with the particular category of services; and
establish a second communication session between the UE and the core network based on determining that the requested second service is not associated with the particular category of services, wherein the UE receives the first service via the first communication session while the UE concurrently receives the second service via the second communication session.

2. The device of claim 1, wherein the particular category of services includes services associated with a threshold amount of maximum latency.

3. The device of claim 1, wherein providing access to the second service via the core network includes providing access to the second service via a user plane function associated with the core network.

4. The device of claim 1, wherein the one or more processors are further configured to:
determine a location of the UE, and
wherein selecting the particular MEC device from the plurality of MEC devices is further based on the location of the UE.

5. The device of claim 1, wherein the particular category is associated with a particular Quality-of-Service Class Identifier ("QCI").

6. A non-transitory computer-readable medium, storing a plurality of processor-executable instructions to:
identify a first request, associated with a User Equipment ("UE"), to access a first service from a wireless network that includes a core network and a plurality of Multi-Access/Mobile Edge Computing ("MEC")

devices that are each communicatively coupled to a respective base station of the wireless network, wherein each base station implements one or more respective radio access technologies ("RATs");

determine that the requested first service is associated with a particular category of services;

determine that the UE implements a particular RAT;

select a particular MEC device, from the plurality of MEC devices, based on determining that the UE implements the particular RAT, and further based on determining that the MEC device is communicatively coupled to a particular base station that implements the particular RAT;

establish a first communication session between the UE and the selected particular MEC device via the particular base station based on determining that the requested first service is associated with the particular category of services;

identify a second request, associated with the UE, to access a second service from the wireless network;

determine that the requested second service is not associated with the particular category of services; and establish a second communication session between the UE and the core network based on determining that the requested second service is not associated with the particular category of services, wherein the UE receives the first service via the first communication session while the UE concurrently receives the second service via the second communication session.

7. The non-transitory computer-readable medium of claim 6, wherein the particular category of services includes services associated with a threshold amount of maximum latency.

8. The non-transitory computer-readable medium of claim 6, wherein providing access to the second service via the core network includes providing access to the second service via a user plane function associated with the core network.

9. The non-transitory computer-readable medium of claim 6, wherein the plurality of processor-executable instructions further include processor-executable instructions to:
determine a location of the UE,
wherein selecting the particular MEC device from the plurality of MEC devices is further based on the location of the UE.

10. The non-transitory computer-readable medium of claim 6, wherein the particular category is associated with a particular Access Point Name ("APN").

11. A method, comprising:
identifying a first request, associated with a User Equipment ("UE"), to access a first service from a wireless network that includes a core network and a plurality of Multi-Access/Mobile Edge Computing ("MEC") devices that are each communicatively coupled to a respective base station of the wireless network, wherein each base station implements one or more respective radio access technologies ("RATs");

determining that the requested first service is associated with a particular category of services;

determining that the UE implements a particular RAT;

selecting a particular MEC device, from the plurality of MEC devices, based on determining that the UE implements the particular RAT, and further based on determining that the MEC device is communicatively coupled to a particular base station that implements the particular RAT;

establishing a first communication session between the UE and the selected particular MEC device via the particular base station based on determining that the requested first service is associated with the particular category of services;

identifying a second request, associated with the UE, to access a second service from the wireless network;

determining that the requested second service is not associated with the particular category of services; and establishing a second communication session between the UE and the core network based on determining that the requested second service is not associated with the particular category of services, wherein the UE receives the first service via the first communication session while the UE concurrently receives the second service via the second communication session.

12. The method of claim 11, wherein the particular category of services includes services associated with a threshold amount of maximum latency.

13. The method of claim 11, further comprising:
determining a location of the UE,
wherein selecting the particular MEC device from the plurality of MEC devices is further based on the location of the UE.

14. The method of claim 11, wherein the particular category is associated with a particular Allocation and Retention Priority ("ARP").

15. The method of claim 11, wherein the first communication session is associated with a first communication session identifier, and wherein the second communication session is associated with a second communication session identifier.

16. The device of claim 1, wherein the first communication session is associated with a first communication session identifier, and wherein the second communication session is associated with a second communication session identifier.

17. The non-transitory computer-readable medium of claim 6, wherein the first communication session is associated with a first communication session identifier, and wherein the second communication session is associated with a second communication session identifier.

18. The non-transitory computer-readable medium of claim 10, wherein the particular category is further associated with at least one of:
a particular Quality-of-Service Class Identifier ("QCI"),
a particular Service Provider Identifier ("SPID"), or
a particular Allocation and Retention Priority ("ARP").

19. The device of claim 5, wherein the particular category is further associated with at least one of:
a particular Access Point Name ("APN"),
a particular Service Provider Identifier ("SPID"), or
a particular Allocation and Retention Priority ("ARP").

20. The method of claim 14, wherein the particular category is further associated with at least one of:
a particular Access Point Name ("APN"),
a particular Quality-of-Service Class Identifier ("QCI"), or
a particular Service Provider Identifier ("SPID").

* * * * *